Nov. 2, 1937.  E. C. LONG  2,097,570
PISTON FOR INTERNAL COMBUSTION MOTORS
Filed May 21, 1934
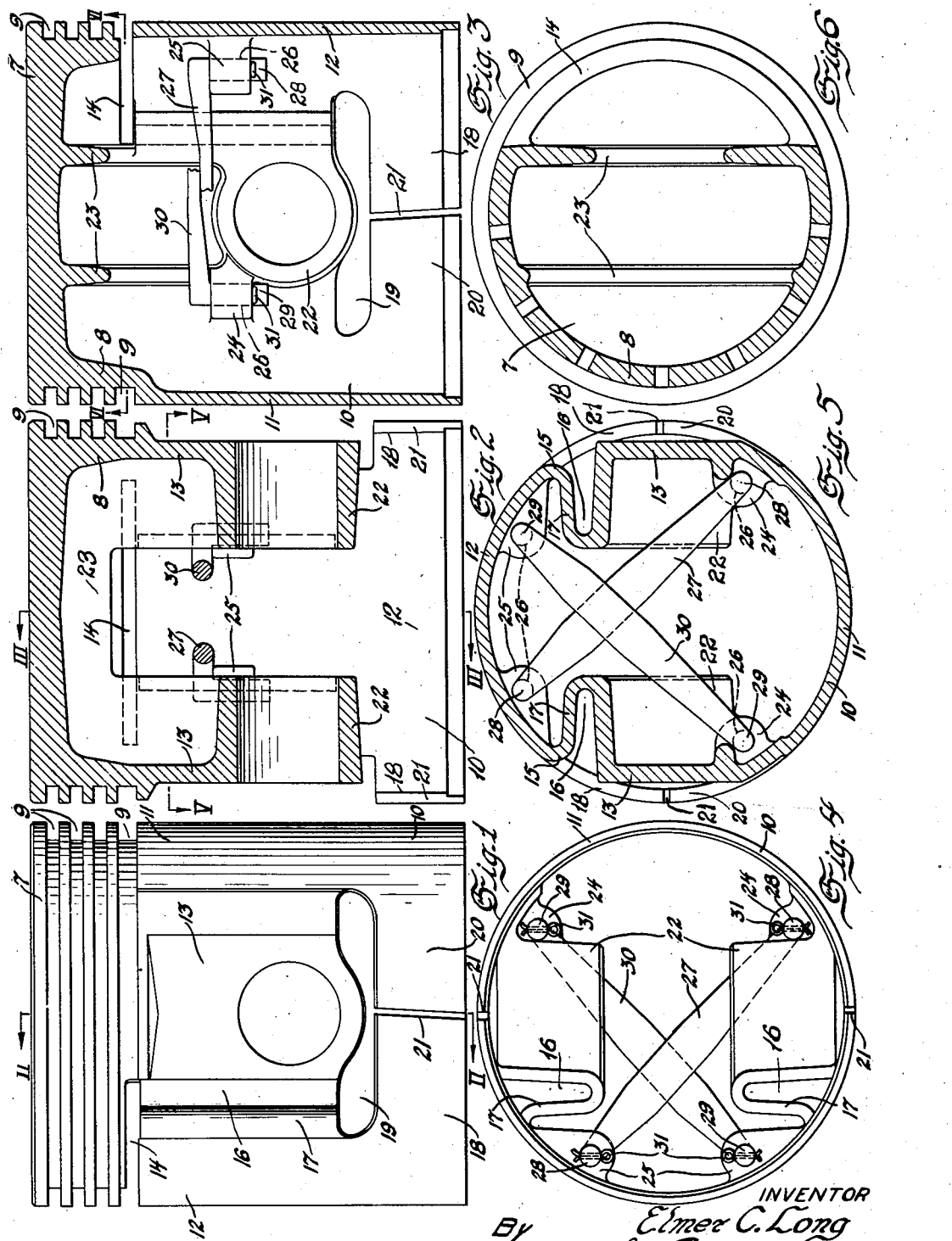
INVENTOR
Elmer C. Long
By Herbert G. Fletcher ATTORNEY.

Patented Nov. 2, 1937

2,097,570

UNITED STATES PATENT OFFICE 2,097,570

PISTON FOR INTERNAL COMBUSTION MOTORS

Elmer C. Long, Grosse Pointe Park, Mich.

Application May 21, 1934, Serial No. 726,743

9 Claims. (Cl. 309—13)

This invention relates to pistons for internal combustion motors and pertains more particularly to pistons made of metal having a high co-efficient of expansion, such as aluminum or aluminum alloys, such pistons to be used in cast iron cylinders having a lower co-efficient of expansion than the pistons.

The present invention is an improvement over the piston claimed in my co-pending application Serial No. 339,892, filed November 22, 1919, the present invention however, showing and describing a piston of a different construction.

The principal object of the invention is to provide a piston having a skirt with a flexible thrust side and an opposing solid thrust side, and with means extending from the solid thrust side adjacent the pin bosses to the flexible thrust side to substantially maintain the flexible thrust side with a minimum clearance between it and the cylinder wall.

Other and further objects will appear in the specification and be specifically pointed out in the appended claims, reference being had to the accompanying drawing, exemplifying the invention, and in which:—

Figure 1 is a pin boss side elevation of a piston constructed in accordance with the invention.

Figure 2 is a vertical section taken approximately on the line II—II of Fig. 1.

Figure 3 is a vertical section taken approximately on the line III—III of Fig. 2.

Figure 4 is an open end elevation of Fig. 1.

Figure 5 is a horizontal section taken approximately on the line V—V of Fig. 2.

Figure 6 is an inverted horizontal section taken approximately on the line VI—VI of Fig. 3.

Referring to the several figures of the drawing, the piston shown comprises a head 7 having a side wall 8 in which packing ring recesses 9 are formed, and depended from the side wall 8 of the head, is the piston skirt 10.

The skirt 10 is provided with opposing thrust sides 11 and 12, and opposing pin boss sides 13 which are disposed at right-angles to the skirt thrust sides 11 and 12.

The skirt thrust side 11 is formed integral with and depends from the side wall 8 of the head and forms the power thrust side of the piston. The skirt thrust side 12 is separated from the side wall 8 of the head by a transverse slot 14 which is formed in the lowermost piston ring groove 9, the thrust side 12 on its side edges 15 being separated from the pin boss sides 13 by respective grooves 16 which are formed by respective reversely curved webs 17 which connect the pin boss sides at their inner ends and the thrust side 12, at the side edges 15, as shown more clearly in Fig. 5.

The skirt thrust side 12 at its lower end and on each side, is provided with a portion 18 which extends beneath a respective pin boss side 13 and is separated from the pin boss sides by respective transverse gaps 19 which extend from respective grooves 16.

Each transverse slot 19 also provides a portion 20 which extends from the skirt thrust side 11 beneath each pin boss side, the portions 18 and 20 on each pin boss side being separated by respective longitudinal slots 21 which extend from the open end of the piston skirt, to respective transverse gaps 19.

Each pin boss side 13 is provided with an inwardly extending pin boss 22, and joining the pin bosses, the pin boss sides and the interior of the head, is a pair of ribs or webs 23.

The thrust side 12 of the skirt 10 provides the compression thrust side of the skirt, and is separated from the other parts of the piston by the transverse slot 14, longitudinal grooves 16, transverse gaps 19 and longitudinal slots 21, the reversely curved webs 17 therefore being the only connections of the thrust side 12 and the pin boss sides 13 or the pin bosses 22, and consequently a yieldably resilient support is provided by the webs 17 for the compression thrust side 12.

Each pin boss side 13 adjacent the power thrust side 11 interiorly of the piston, is provided with a lug 24, and formed integral with the compression thrust side 12 are a pair of lugs 25, the lugs 24 and 25 each having a vertically disposed opening 26.

The lugs 24 and 25 are on the same horizontal plane with their upper surfaces on a plane above the pin bosses, and the lugs 24 are wider apart than are the lugs 25. These lugs are for the reception of the ends of a pair of connecting members which are diagonally disposed within the piston skirt, the connecting member 27 having its angular bent end 28 mounted in the opening 26 of a lug 24 and its other angular bent end 28 mounted in the opening 26 of a diagonally disposed lug 25.

The angular bent ends 29 of the connecting member 30 are then engaged in the openings of the other diagonally disposed pair of lugs 24 and 25. The connecting members 27 and 30 are so shaped in respect to each other that the member 30 will overlie the member 27, said members having their angular bent ends secured in respective lugs by cotter pins 31.

The connecting members 27 and 30 are made of steel or any metal having a lower co-efficient of expansion than the skirt, and in operation of the piston, when the piston becomes hot and particularly the head thereof, expansion of the head diametrically across the pin bosses, will be greater at this point by reason of there being more metal provided by the diametrically extending webs 23. As the pin bosses and pin boss sides are moved outwardly by expansion, a pulling force will be given to the ends of the members 27 and 30 where they connect with the lugs 24 on the pin boss sides, and a pulling force will be given to the members and to the lugs 25 on the compression thrust side 12 of the skirt, and as the thrust side 12 is yieldingly supported by the curved webs 17, said thrust side 12 will in a sense be pulled inward by the diagonal disposition of the members 27 and 30, while the pin boss sides 13 and the power thrust side 11, are moved outwardly by expansion of the head. Obviously and as shown, the compression thrust side 12 of the skirt is separated from the side wall 3 of the head by the transverse slot 14, and therefore is not capable of being carried outward by expansion of the head.

The pin boss sides 13 on their outer peripheries are inset from the skirt diameter in the manufacture of the piston, and therefore outward movement of the pin boss sides by expansion, will not affect or engage the cylinder wall.

In the event of wear from use on the thrust sides 11 and 12 of the piston, renewal of the members 27 and 30 of a proper length, will provide for thrusting the flexible thrust side 12 outward so that a more desirable fitting diameter will be given to the worn piston.

Various changes may be made in the details of construction and arrangement of parts without departing from the invention or the scope of the appended claims.

What I claim is:—

1. A piston comprising a head, a skirt having a resiliently flexible thrust side and a solid thrust side, and a pair of transverse members crossing each other intermediate their ends, each being secured at one end to the flexible thrust side and at their other ends to the solid thrust side of the skirt.

2. A piston comprising a head, a skirt having a resiliently flexible thrust side and a solid thrust side, and a pair of transverse members of material different than the skirt crossing each other intermediate their ends, each being secured at one end to the flexible thrust side and at their other ends to the solid thrust side of the skirt.

3. A piston comprising a head, a skirt, and pin bosses, said skirt having a resiliently flexible thrust side and a solid thrust side, and a pair of transverse members located in a plane above the pin bosses and crossing each other intermediate their ends, each being secured at one end to the flexible thrust side and at their opposite ends to the solid thrust side of the skirt.

4. A piston comprising a head, a skirt having a resiliently supported thrust side, and transverse members crossing each other intermediate their ends and connected at one end to said thrust side and at their other ends to other parts of the skirt.

5. A piston comprising a head, a skirt having a resiliently supported thrust side, and transverse members crossing each other intermediate their ends, each being connected at one end to said thrust side and at their other ends to the other side of the skirt.

6. A piston comprising a head, a skirt having a resiliently supported thrust side, pin bosses, and transverse members crossing each other intermediate their ends, each being connected at one end to said thrust side and at their other ends to the skirt on the other side of the pin bosses.

7. A piston comprising a head and a skirt, the skirt having a flexibly supported thrust side, an opposing solid thrust side and a pair of opposing pin boss sides each carrying a pin boss, and a pair of transverse members diagonally disposed within the skirt above the pin bosses, each being connected at one end to the flexible thrust side and at their opposite ends to the pin boss sides of the skirt beyond the pin bosses.

8. A piston comprising a head having a side wall, a skirt having a flexible thrust side, pin bosses, and a pair of transverse members of material different than the skirt, diagonally disposed within the skirt and located in a plane beneath the side wall of the head and crossing respective pin bosses, said members being connected at one end to the flexible thrust side of the skirt and at their other ends to other parts of the skirt.

9. A piston comprising a head having a side wall, a skirt having a flexible thrust side which is disconnected at one end from the side wall of the head and an opposing thrust side united with the side wall of the head, and a pair of transverse members diagonally disposed and crossing each other within the skirt and located in a plane beneath the side wall of the head, said members being connected at one end to the flexible thrust side of the skirt and at their other ends to the skirt adjacent the opposing thrust side.

ELMER C. LONG.